United States Patent
Saito et al.

(10) Patent No.: US 11,796,717 B2
(45) Date of Patent: Oct. 24, 2023

(54) ANTIREFLECTION PLATE

(71) Applicant: FUKUVI CHEMICAL INDUSTRY CO., LTD., Fukui (JP)

(72) Inventors: Masahiro Saito, Fukui (JP); Daisuke Hayashi, Fukui (JP); Yu Arai, Fukui (JP)

(73) Assignee: FUKUVI CHEMICAL INDUSTRY CO., LTD., Fukui (JP)

( * ) Notice: Subject to any disclaimer, the term of this patent is extended or adjusted under 35 U.S.C. 154(b) by 605 days.

(21) Appl. No.: 17/044,614

(22) PCT Filed: Mar. 28, 2019

(86) PCT No.: PCT/JP2019/013696
§ 371 (c)(1),
(2) Date: Oct. 1, 2020

(87) PCT Pub. No.: WO2019/202942
PCT Pub. Date: Oct. 24, 2019

(65) Prior Publication Data
US 2021/0103073 A1    Apr. 8, 2021

(30) Foreign Application Priority Data
Apr. 19, 2018 (JP) .................. 2018-080725

(51) Int. Cl.
*G02B 1/111* (2015.01)
*G02B 1/14* (2015.01)
(Continued)

(52) U.S. Cl.
CPC .............. *G02B 1/111* (2013.01); *B32B 27/08* (2013.01); *B32B 27/308* (2013.01);
(Continued)

(58) Field of Classification Search
None
See application file for complete search history.

(56) References Cited

U.S. PATENT DOCUMENTS

| 2012/0198888 A1 | 8/2012 | Hasegawa et al. |
| 2013/0090403 A1 | 4/2013 | Jung et al. |

(Continued)

FOREIGN PATENT DOCUMENTS

| CN | 103842856 A | 6/2014 |
| JP | 9-288202 A | 11/1997 |

(Continued)

OTHER PUBLICATIONS

Extended European Search Report issued in the corresponding European Patent Application No. 19788715.1 dated Jan. 14, 2022.
(Continued)

*Primary Examiner* — Eli D. Strah
(74) *Attorney, Agent, or Firm* — GREENBLUM & BERNSTEIN, P.L.C.

(57) ABSTRACT

An antireflection plate has a structure in which a hard coat layer, an antireflective layer having a low refractive index layer, a protective layer, and an overcoat layer are laminated in this order on a transparent resin substrate. The low refractive index layer is a cured body of a curable composition containing 50 to 200 parts by mass of (B-2) hollow silica fine particles, and the low refractive index layer has a refractive index of 1.20 to 1.45. The protective layer is a cured body of a curable composition containing 7.5 to 35 parts by mass of (B-3) spherical silica fine particles, and the protective layer has a thickness of 10 to 15 nm and a refractive index of 1.45 to 1.50. The overcoat layer includes a polymer of a fluorine-containing silicon compound.

9 Claims, 1 Drawing Sheet

1: OVERCOAT LAYER, 2: PROTECTIVE LAYER,
3: LOW REFRACTIVE INDEX LAYER (ANTIREFLECTIVE LAYER),
4: HARD COAT LAYER, 5: TRANSPARENT RESIN SUBSTRATE (51) Int. Cl.
  B32B 27/30  (2006.01)
  B32B 27/36  (2006.01)
  B32B 27/08  (2006.01)
  G02B 1/18   (2015.01)

(52) U.S. Cl.
  CPC .............. *B32B 27/365* (2013.01); *G02B 1/14* (2015.01); *B32B 2255/10* (2013.01); *B32B 2255/26* (2013.01); *B32B 2307/40* (2013.01); *B32B 2307/418* (2013.01); *B32B 2457/20* (2013.01); *B32B 2457/202* (2013.01); *B32B 2457/204* (2013.01); *B32B 2457/208* (2013.01); *C09K 2323/03* (2020.08); *C09K 2323/033* (2020.08); *C09K 2323/035* (2020.08); *G02B 1/18* (2015.01)

(56) References Cited

U.S. PATENT DOCUMENTS

| | | |
|---|---|---|
| 2014/0168776 A1 | 6/2014 | Saito et al. |
| 2014/0248478 A1 | 9/2014 | Saito et al. |

FOREIGN PATENT DOCUMENTS

| | | | | |
|---|---|---|---|---|
| JP | 2003-176426 A | | 6/2003 | |
| JP | 2004-69760 A | | 3/2004 | |
| JP | 2004-93773 A | | 3/2004 | |
| JP | 2004069760 A | * | 3/2004 | |
| JP | 2004-133034 A | | 4/2004 | |
| JP | 2016-138208 A | | 8/2016 | |
| JP | 2017178634 A | * | 10/2017 | ............. C03B 27/03 |
| WO | 2013/018187 A1 | | 2/2013 | |
| WO | WO-2013153648 A1 | * | 10/2013 | ............. G02B 1/105 |

OTHER PUBLICATIONS

Office Action issued in the corresponding Chinese Patent Application No. 201980026775.7 dated Nov. 26, 2021, along with English translation thereof.

International Search Report issued in International Patent Application No. PCT/JP2019/013696, dated Jul. 2, 2019, along with an English translation thereof.

* cited by examiner

Fig. 1

1: OVERCOAT LAYER, 2: PROTECTIVE LAYER,
3: LOW REFRACTIVE INDEX LAYER (ANTIREFLECTIVE LAYER),
4: HARD COAT LAYER, 5: TRANSPARENT RESIN SUBSTRATE

Fig. 2

1: OVERCOAT LAYER, 2: PROTECTIVE LAYER,
3: LOW REFRACTIVE INDEX LAYER, 4: HIGH REFRACTIVE INDEX LAYER
5: MEDIUM REFRACTIVE INDEX LAYER, 6: ANTIREFLECTIVE LAYER,
7: HARD COAT LAYER, 8: TRANSPARENT RESIN SUBSTRATE

ANTIREFLECTION PLATE

TECHNICAL FIELD

This invention relates to an antireflection plate having high antireflective ability and excellent in abrasion resistance and antifouling properties.

BACKGROUND ART

A front panel of a display device, such as a cathode-ray tube (CRT), a liquid crystal display (LCD), or a plasma display (PDP), has so far been overlaid with an antireflective film, or mounted with an antireflection plate, in order to prevent reflection from the surface for increased visibility of the screen.

A transparent resin laminated sheet with antireflective ability, which has multilayered films formed on a plastic substrate, is also publicly known. For example, a transparent resin laminated sheet excellent in abrasion resistance, scuff resistance, adhesion, and light perviousness is known in which a high refractive index layer, a low refractive index layer, and a coating layer are stacked in this order on a plastic substrate pervious to light (Patent Document 1).

Nowadays, even in a touch panel of an automated teller machine (ATM) of a financial institution, a ticket machine, etc., an antireflective function is required for ensuring more visibility.

The above touch panel is less susceptible to an environment, because it is normally used indoors. A touch panel for use in a car navigation system, however, is often used under meteorological conditions with a cloud of dust or under geographical conditions near the seashore, because an automobile is originally used outdoors. Sand has high hardness, and its particles have sharp projections. If the touch panel is used in an environment involving much sand, therefore, its surface may be scratched and the surface may glare or peel, leading to a marked decline in the antireflective ability. With the touch panel, moreover, lipids of a user's finger necessarily leave fingerprints behind, similarly decreasing visibility. Thus, antifouling properties are also required.

PRIOR ART DOCUMENTS

Patent Documents

Patent Document 1: JP-A-Hei-9-138202

SUMMARY OF THE INVENTION

Problems to be Solved by the Invention

The present invention is designed to solve the above-described problems, and is aimed at providing an antireflection plate which exhibits high antireflective ability and excels in abrasion resistance and antifouling properties.

The present inventors conducted various studies on these problems, and obtained the following findings: Abrasion resistance is improved by providing a protective layer of a specific composition on the visual field side of a low refractive index layer exhibiting antireflective ability; and further by controlling the particle diameter and compounded amount of silica fine particles contained in the low refractive index layer for achieving a low refractive index, and the particle diameter and compounded amount of silica fine particles contained in the protective layer. The inventors also found that antifouling properties were exhibited by providing an overcoat layer of a specific composition on an outermost layer. These findings led them to accomplish the present invention.

Means for Solving the Problems

That is, according to the present invention, there is provided an antireflection plate in which a hard coat layer, an antireflective layer having a low refractive index layer, a protective layer, and an overcoat layer are laminated in this order on a transparent resin substrate, wherein the low refractive index layer is a cured body of a curable composition containing 50 to 200 parts by mass of (B-2) hollow silica fine particles having an average particle diameter of 10 to 150 nm with respect to a total of 100 parts by mass of 90 to 98 parts by mass of (C) a silane coupling compound or a hydrolysate thereof and 10 to 2 parts by mass of (D) a metal chelate compound, the low refractive index layer having a refractive index of 1.20 to 1.45, the protective layer is a cured body of a curable composition containing 7.5 to 35 parts by mass of (B-3) spherical silica fine particles having an average particle diameter of 10 nm or less with respect to a total of 100 parts by mass of 90 to 98 parts by mass of (C) a silane coupling compound or a hydrolysate thereof and 10 to 2 parts by mass of (D) a metal chelate compound, the protective layer having a thickness of 10 to 15 nm and a refractive index of 1.45 to 1.50, and the overcoat layer comprises (E) a polymer of a fluorine-containing silicon compound.

In the invention of the antireflection plate described above, it is preferred that 1) the antireflective layer be composed of two layers, i.e., the low refractive index layer, and a medium refractive index layer provided on the transparent resin substrate side of the low refractive index layer and having a refractive index of 1.50 to 1.75;

2) the medium refractive index layer be a cured body of a curable composition containing 100 to 175 parts by mass of (F) an organic-inorganic composite compound and 150 to 300 parts by mass of (G) metal oxide particles with respect to a total of 100 parts by mass of 90 to 95 parts by mass of (C) a silane coupling compound or a hydrolysate thereof and 10 to 5 parts by mass of (D) a metal chelate compound;

3) the organic-inorganic composite compound (F) be a composite compound of a structure having an alkoxysilyl group bound to a bisphenol A epoxy compound, a novolak phenol compound, or a polyamic acid compound;

4) the antireflective layer be composed of three layers, i.e., the low refractive index layer, a medium refractive index layer having a refractive index of 1.50 to 1.75, and a high refractive index layer provided between the low refractive index layer and the medium refractive index layer and having a refractive index of 1.60 to 2.00, the refractive index of the high refractive index layer being greater than the refractive index of the medium refractive index layer;

5) the high refractive index layer be a cured body of a curable composition containing 100 to 600 parts by mass of (G) metal oxide particles with respect to a total of 100 parts by mass of 75 to 95 parts by mass of (C) a silane coupling compound or a hydrolysate thereof and 25 to 5 parts by mass of (D) a metal chelate compound;

6) the hard coat layer comprises a resinous cured body of a curable composition containing (A) a polymerizable monomer, (B-1) silica fine particles, (C) a silane coupling compound or a hydrolysate thereof, and (D) a metal chelate compound, the polymerisable monomer (A) being contained in an amount of 1500 to 2000 parts by mass, and the silica fine particles (B-1) being contained in an amount of 300 to 500 parts by mass, with respect to a total of 100 parts by mass of 95 to 99 parts by mass of the silane coupling compound or hydrolysate thereof (C) and 1 to 5 parts by mass of the metal chelate compound (D); and 7) in the curable composition for formation of the hard coat layer, the polymerizable monomer (A) comprises a hexafunctional or higher functional urethane acrylate monomer, a trifunctional or tetrafunctional urethane acrylate monomer, and a bifunctional acrylate monomer, the trifunctional or tetrafunctional urethane acrylate monomer being contained in an amount of 5.0 to 15.0 parts by mass, and the bifunctional acrylate monomer being contained in an amount of 5.0 to 10.0 parts by mass, with respect to 100 parts by mass of the hexafunctional or higher functional urethane acrylate monomer.

Further, the present invention provides an antireflective display device characterized in that the antireflection plate is laminated on the surface of a display device via the transparent resin substrate of the antireflection plate.

Effects of the Invention

The antireflection plate of the present invention is excellent in abrasion resistance in addition to high antireflective ability. It is also excellent in antifouling properties against lipids.

Hence, it is effectively used not only in general display devices, but also in panels of devices requiring high abrasion resistance, such as touch panels of car navigation systems, single-lens reflex cameras, and medical panels. Furthermore, the antireflection plate can be used suitably in display devices used outdoors, such as those of smartphones and tablets.

MODE FOR CARRYING OUT THE INVENTION

Figure 1:
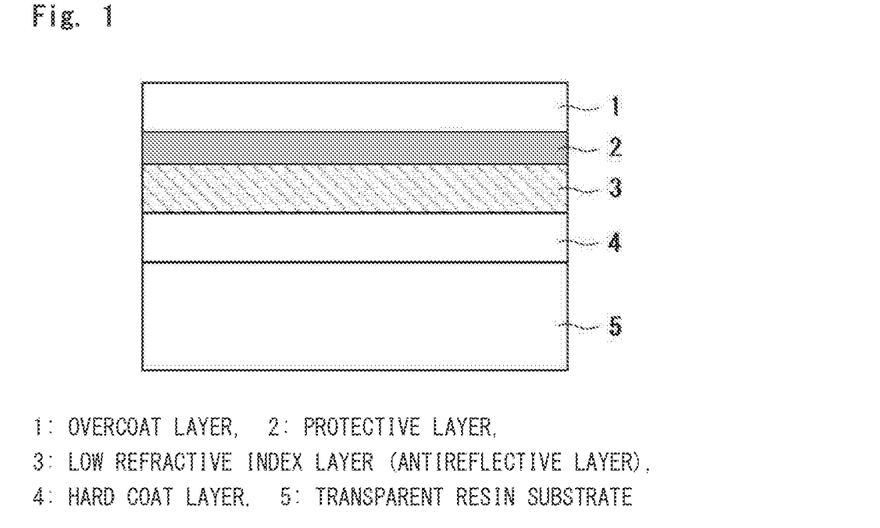
FIG. 1 is a schematic view showing the cross-sectional structure of a representative antireflection plate according to the present invention.

The anti reflection plate of the present invention has a fundamental structure in which a transparent resin substrate, a hard coat layer, an antireflective layer, a protective layer, and an overcoat layer are layered in this order. The antireflection plate is further characterised in that these layers possess the aforementioned specific structures, physical properties, and components.

[Transparent Resin Substrate]

There are no restrictions as to the transparent resin substrate, as long as it is made of a transparent resin excellent in impact strength and not impairing visual field properties. From the viewpoints of transparency and impact strength, a substrate comprising an aromatic polycarbonate resin or a polymethyl methacrylate resin is preferred. The substrate may be a laminated substrate composed of an aromatic polycarbonate resin and a polymethyl methacrylate resin. The thickness of the substrate is designed based on appropriate selection in view of the required transparency and impact strength, and is usually selected from the range of 0.2 to 3.0 mm.

[Hard Coat Layer]

Onto the transparent resin substrate, the hard coat layer is laminated, and the antireflective layer to be described later is formed thereon.

The hard coat layer is a layer contributing to the strength of the antireflection plate and the adhesion between the transparent resin substrate and the antireflective layer. An improvement in the adhesion renders the abrasion resistance and hardness of the inventive antireflection plate excellent.

The hard coat layer comprises a resinous cured body. Usually used is a resinous cured body obtained by curing through polymerisation or a polymerizable polyfunctional acrylate, such as dipentaerythritol hex a (meth)acrylate, phenyl glycidyl ether (meth)acrylate hexamethylenediisocyanate urethane prepolymer, phenyl glycidyl ether (meth)acrylate isophorone diisocyanate urethane prepolymer, phenyl glycidyl ether (meth)acrylate tolylene diisocyanate urethane prepolymer; or glycerin di(meth)acrylate tolylene diisocyanate urethane oligomer, pentaerythritol tri(meth)acrylate hexamethylene diisocyanate urethane oligomer, glycerin di(meth)acrylate isophorone diisocyanate urethane oligomer, pentaerythritol tri(meth)acrylate tolylene diisocyanate urethane oligomer, or pentaerythritol tri(meth)acrylate isophorone diisocyanate urethane oligomer.

In order to achieve excellence in the adhesion between the transparent resin substrate and the antireflective layer and the hardness of the antireflection plate itself, in particular, a resinous cured body of the following composition is preferred as the hard coat layer:

The preferred curable composition for use in the formation of the hard coat layer is a curable composition containing (A) a polymerizable monomer, (B-1) silica fine particles, (C) a silane coupling compound or a hydrolysate thereof, and (Di a metal chelate compound, the polymerizable monomer (A) being contained in an amount of 1500 to 2000 parts by mass, and the silica fine particles (B-1) being contained in an amount of 300 to 500 parts by mass, with respect to a total of 100 parts by mass of 95 to 99 parts by mass of the silane coupling compound or hydrolysate thereof (C) and 1 to 5 parts by mass of the metal chelate compound (D).

<Polymerizable Monomer>

The polymerizable monomer is a component which after polymerization curing serves as a base material for the hard coat layer. This component is used in combination with the other essential components, and its type is not particularly restricted.

Examples of the polymerizable monomer are the following compounds:

Monofunctional Acrylate Monomer:

An acrylate monomer, such as methyl (meth)acrylate, ethyl (meth)acrylate, n-butyl (meth)acrylate, lauryl (meth)acrylate, or hydroxyethyl (meth)acrylate, is named.

Bifunctional Acrylate Monomer:

There is named a bifunctional acrylate compound, such as ethylene glycol (meth)acrylate, or a bifunctional urethane acrylate compound which is obtained by a polyaddition reaction between a diisocyanate compound and a (meth)acrylate compound having a plurality of hydroxyl groups, and the number of whose (meth)acryloyl groups is controlled to two. As regards the conditions for the polymerization addition reaction, the starting materials, etc., publicly known methods are adopted without limitation.

Tri- to Tetrafunctional Acrylate Monomer:

There is named a tri- to tetrafunctional acrylate compound, such as pentaerythritol tri(meth)acrylate, dipentaerythritol tri(meth)acrylate, dipentaerythritol tetra(meth)acrylate, or trimethylolpropane tri(meth)acrylate, or a tri- to tetrafunctional urethane acrylate compound which is obtained by a polyaddition reaction between a diisocyanate compound and a (meth)acrylate compound having a plurality of hydroxyl groups, and the number of whose (meth)acryloyl groups is controlled to three or four. As regards the conditions for the polymerization addition reaction, the starting materials, etc., publicly known methods are adopted without limitation.

Hexafunctional Acrylate Monomer:

A (meth)acrylate compound having six (meth)acryloyl groups, such as dipentaerythritol hexaacrylate, is named. Preferably, a hexafunctional urethane acrylate compound, which is obtained by a polyaddition reaction between a diisocyanate compound and a (meth)acrylate compound having a plurality of hydroxyl groups and the number of whose (meth)acryloyl groups is controlled to six, is used, because this compound forms a dense layer with high surface hardness. As regards the conditions for the polymerization addition reaction, the starting materials, etc., publicly known methods are adopted without limitation.

Each of the above-mentioned monomers is on the market and generally available. The various urethane acrylate monomers are also commercially available from SHIN-NAKAMURA CHEMICAL CO., LTD., KYOEISHA CHEMICAL CO., LTD., KSM CHEMICAL ARTIST, Negami Chemical Industrial Co., Ltd., The Nippon Synthetic Chemical Industry Co., Ltd., TOMOE Engineering Co., Ltd., and Toyo Chemicals Co., Ltd.

The above polymerizable monomers are used in a suitable combination in view of impact strength, adhesion to the antireflective layer, and the viscosity of the monomer, in addition to the hardness of the cured body after curing. If the polymerizable monomer (A) is a mixed composition containing 5.0 to 15.0 parts by mass of the tri- to tetrafunctional urethane acrylate monomer, and 5.0 to 10.0 parts by mass of the bifunctional acrylate monomer, with respect to 100 parts by mass of the hexafunctional or higher functional urethane acrylate monomer, in particular, such a mixed composition is markedly preferred from the viewpoints of the adhesion to the antireflective layer, light resistance, flexibility, and hardness.

<(B-1) Silica Fine Particles>

The silica fine particles for use in the hard coat layer are particles contributing to improvements in the adhesion and coating properties. Their properties are not particularly limited, but usually, they are spherical in shape, their average particle diameter is 5 to 30 nm, and their refractive index is 1.44 to 1.50. The average particle diameter outside this range tends to worsen crack resistance.

The above silica fine particles are nonhollow particles which comprise single particles, are dense inside, and have no cavities interiorly. Their density normally is 1.9 g/cm$^3$ or more. These silica fine particle are themselves publicly known and commercially available. Thus, their marketed products satisfying the aforementioned average particle diameter and refractive index may be selected and used. Normally, the silica fine particles are supplied as a dispersion in a solvent. This solvent necessarily mixes into a solution of the curable composition for formation of the hard coat layer, and behaves like other solvents.

<(C) Silane Coupling Compound or Hydrolysate Thereof>

The silane coup-ling compound or hydrolysate thereof itself decomposes hydrolytically to form a dense siliceous film.

As the silane coupling compound, publicly known ones can be used without limitation. Their examples are γ-methacryloxypropyltrimethoxysilane, γ-methacryloxypropylmethyldimethoxysilane, 3-acryloxypropyltrimethoxysilane, vinyltrimethoxysilane, vinyltriethoxysilane, p-styryltrimethoxysilane, γ-glycidoxypropyltrimethoxysilane, 2-(3,4-epoxycyclohexyl)ethyltrimethoxysilane, γ-glycidoxypropylmethyldimethoxysilane, 3-glycidoxypropylmethyldiethoxysilane, γ-aminopropyltrimethoxysilane, 3-aminopropyltrimethoxysilane, N-2-(aminoethyl)-3-aminopropylmethyldimethoxysilane, N-2-(aminoethyl)-3-aminopropyltriethoxysilane, 3-mercaptopropylmethyldimethoxysilane, 3-mercaptopropyltrimethoxysilane, and 3-isocyanato propyltriethoxysilane.

The silane coupling compound, depending on its type, is preferably a decomposition product formed by preliminary hydrolysis with a dilute acid or the like, for the purpose of improving solubility in water or a solvent. The method of the preliminary hydrolysis is not particularly limited, and is generally a method which comprises hydrolyzing a part of the compound with the use of an acid catalyst such as acetic acid.

<(D) Metal Chelate Compound>

This is a component serving a function as a crosslinking agent, and acting to make the resulting hard coat layer a denser cured body.

The metal chelate compound is a compound in which a chelating agent typified by a bidentate ligand is coordinated with a metal ion such as a tetravalent titanium metal ion, a tetravalent zirconium metal ion, or a trivalent aluminum metal ion.

Its concrete examples are:

titanium chelate compounds such as triethoxy-mono(acetylacetonato)titanium, diethoxy-bis(acetylacetonato)titanium, monoethoxy-tris(acetylacetonato)titanium, tetrakis(acetylacetonato)titanium, triethoxy-mono(ethylacetoacetato)titanium, diethoxy-bis(ethylacetoacetato)titanium, monoethoxy-tris(ethylacetoacetato)titanium, mono(acetylacetonato)tris(ethylacetoacetato)titanium, bis(acetylacetonato)bis(ethylacetoacetato)titanium, and tris(acetylacetonato)mono(ethylacetoacetato)titanium;

zirconium chelate compounds such as triethoxy-mono(acetylacetonato)zirconium, diethoxy-bis(acetylacetonato)zirconium, monoethoxy-tris(acetylacetonato)zirconium, tetrakis(acetylacetonato)zirconium, triethoxy-mono(ethylacetoacetato)zirconium, diethoxy-bis(ethylacetoacetato)zirconium, monoethoxy-tris(ethylacetoacetato)zirconium, tetrakis(ethylacetoacetato)zirconium, mono(acetylacetonato)tris(ethylacetoacetato)zirconium, bis(acetylacetonato)bis(ethylacetoacetato)zirconium, and tris(acetylacetonato)mono(ethylacetoacetato)zirconium; and aluminum chelate compounds such as diethoxy-mono(acetylacetonato)aluminum, monoethoxy-bis(acetylacetonato)aluminum, di-i-propoxy-mono(acetylacetonato)aluminum, monoethoxy-bis(ethylacetoacetato)aluminum, and diethoxy-mono(ethylacetoacetato)aluminum.

The preferred composition for formation of the hard coat layer is a curable composition containing the aforementioned polymerizable monomer (A), silica fine particles (B-1), silane coupling compound or hydrolysate thereof (C), and metal chelate compound (D). Preferably, these components are compounded in the following specific proportions:

The content of the polymerizable monomer (A) is 1500 to 2000 parts by mass with respect to a total of 100 parts by mass of the silane coupling compound or hydrolysate thereof (C) and the metal chelate compound (D). If its content is less than 1500 parts by mass, the formation of the hard coat layer is insufficient. If its content exceeds 2000 parts by mass, an appearance failure occurs.

The content of the silica fine particles (B-1) is 300 to 500 parts by mass with respect to a total of 100 parts by mass of the silane coupling compound or hydrolysate thereof (C) and the metal chelate compound (D). If its content, is less than 300 parts by mass, the appearance of the resulting product is insufficient. If its content exceeds 500 parts by mass, impact resistance tends to worsen.

The compounded amount of the silane coupling compound or hydrolysate thereof (C) is preferably 95 to 99 parts by mass with respect to a total of 100 parts by mass of the silane coupling compound or hydrolysate thereof (C) and the metal chelate compound (D). If its compounded amount is less than 95 parts by mass, the adhesion of the resulting film is poor. If this amount, exceeds 99 parts by mass, the smoothness of the hard coat layer tends to worsen.

The compounded amount of the metal chelate compound (D) is preferably 1 to 5 parts by mass with respect to a total of 100 parts by mass of the metal chelate compound (D) and the silane coupling compound or hydrolysate thereof (C). If its compounded amount falls outside this range, the adhesion of the hard coat layer to the antireflective layer formed thereon is poor. Alternatively, the denseness of the resulting layer becomes insufficient, and its hardness tends to lower.

To the curable composition, arbitrary additives can be added in a range in which the intended purpose is not impaired, with the aim of adjusting the viscosity or facilitating coating. A publicly known ultraviolet absorber can also be added. In order to cure the composition on the transparent resin substrate, turning it into the hard coat layer, in particular, a polymerisation initiator such as a heat polymerisation initiator or a photopolymerization initiator is usually added in a catalytic amount, usually, in an amount of 0.01~20% by mass based on the total solids content of the composition. This polymerization initiator does not exert an essential influence on the various properties of the hard coat layer to be obtained by curing the curable composition.

<Formation of Hard Coat Layer>

The above indispensable components, and further the arbitrary components are usually mixed with, and stir red together with, a solvent to be described below, in an arbitrary order at a temperature in the vicinity of room temperature, whereby they are formed into a solution of the curable composition. This solution is coated on the transparent resin substrate, and then the solvent is dried at 50° C. or higher. Then, the coating is cured by irradiation with ultraviolet radiation to form a hard coat layer. The thickness of this layer is set at 1 to 100 μm, preferably 1 to 30 μm, more preferably 1 to 10 μm.

The suitable solvent used is an alcohol-based solvent such as ethyl alcohol or (iso)propyl alcohol; an aromatic solvent such as toluene or xylene; an acetic acid ester-based solvent such as (iso)butyl acetate; or a ketone-based solvent such as methyl, ethyl ketone (MEK) or methyl isobutyl ketone (MIBK). Any of these solvents is removed by evaporation during the formation of the hard coat layer.

The method of coating the solution on the transparent resin substrate is not particularly limited. A method such as dip coating, roll coating, die coating, flow coating, or spraying is employed, but from the viewpoints of appearance quality and layer thickness control, the dip; coating method is preferred.

[Antireflective Layer]

The antireflection plate of the present invention has an anti reflective layer laminated directly on the hard coat layer laminated on the transparent resin substrate. The antireflective layer has a low refractive index layer having a refractive index of 1.25 to 1.40 as an indispensable layer. If the refractive index of the low refractive index layer fails outside this range, this layer does not function as an anti-reflective layer. As will be described later, if the antireflective layer comprises a plurality of antireflective coatings, the low refractive index layer is located in the outermost coating (visual field side) of the antireflective layer.

<(B-2) Hollow Silica Fine Particles>

Hollow silica fine particles to be incorporated into the low refractive index layer are particles for controlling the refractive index of this layer. It is essential that the average particle diameter of these particles be 10 to 150 nm, and a particle diameter smaller than the layer thickness of the low refractive index layer has to be selected.

The hollow silica fine particles have cavities inside. Their void content is 20 to 70% preferably 30 to 50% and their refractive index is usually 1.30 or less.

If the average particle diameter falls outside the above range, the reflection performance declines, or the haze rate rises. Even if a protective layer is provided, moreover, the abrasion resistance which is the effect of the present invention does not increase. The average particle diameter is preferably 50 to 100 nm, more preferably 50 to 70 nm.

As the hollow silica fine particles, those which satisfy the above average particle diameter may be selected from commercially available products, and used. Since the hollow silica fine particles are also available usually in a solvent-dispersed form, the solvent behaves as in the case of the silica fine particles (B-1).

As the silane coupling compound or hydrolysate thereof (C) and the metal chelate compound (D), those described in connection with the aforementioned paragraph on the hard coat layer are used in the same manner as described therein.

<Composition for Formation of Low Refractive Index Layer>

A composition for formation of the low refractive index layer is a curable composition consisting essentially of the hollow silica fine particles (B-2), silane coupling compound or hydrolysate thereof (C), and metal chelate compound (D) mentioned above.

In order to exhibit excellent abrasion resistance in addition to antireflective ability, it is important for the antireflection plate of the present invention to be prepared using the following formulation:

The hollow silica fine particles (B-2) are contained in an amount of 50 to 200 parts by mass with respect to a total of 100 parts by mass of the silane coupling compound or hydrolysate thereof (C) and the metal chelate compound (D). If their amount contained is less than 50 parts by mass, a low refractive index is unachievable. If this amount exceeds 200 parts by mass, the abrasion resistance lowers to impair the characteristics of the present invention.

The silane coupling compound or hydrolysate thereof (C) and the metal chelate compound (D) are used at a mass ratio of 90:10 to 98:2 (total 100 parts by mass). If the compounding ratio between these two components fails to satisfy this numerical range, decreased layer strength and coating film failure as a low refractive index layer occur, fundamental layer characteristics are not exhibited, and the resulting product does not function as such a layer.

In order to enhance the adhesion to the transparent resin substrate, densify the resulting layer, and highly strengthen it, a tetraalkoxysilicon compound, such as tetramethoxysilane, tetraethoxysilane, or tetrapropoxysilane, can be incorporated, in addition to the above essential components, into the composition for the formation of the low refractive index layer. To promote the hydrolysis and condensation of the silane coupling compound or hydrolysate thereof (C) or the tetraalkoxysilicon compound, moreover, an aqueous solution of an acid, such as an aqueous solution of hydrochloric acid, can be incorporated in a suitable amount into the composition for the formation of the low refractive index layer.

<Formation of Low Refractive Index Layer>

The low refractive index layer is formed on the hard coat layer laminated on the transparent resin substrate. The formation of the low refractive index layer is performed in accordance with the formation of the hard coat layer. That is, a solution of the composition for formation of the low refractive index layer is coated on the hard coat layer, the cured body, and then dried, whereafter the coating is heated at 70 to 120° C. for curing. The thickness of the resulting layer is set usually at 50 to 200 nm from the viewpoint of antireflective performance.

Figure 2:
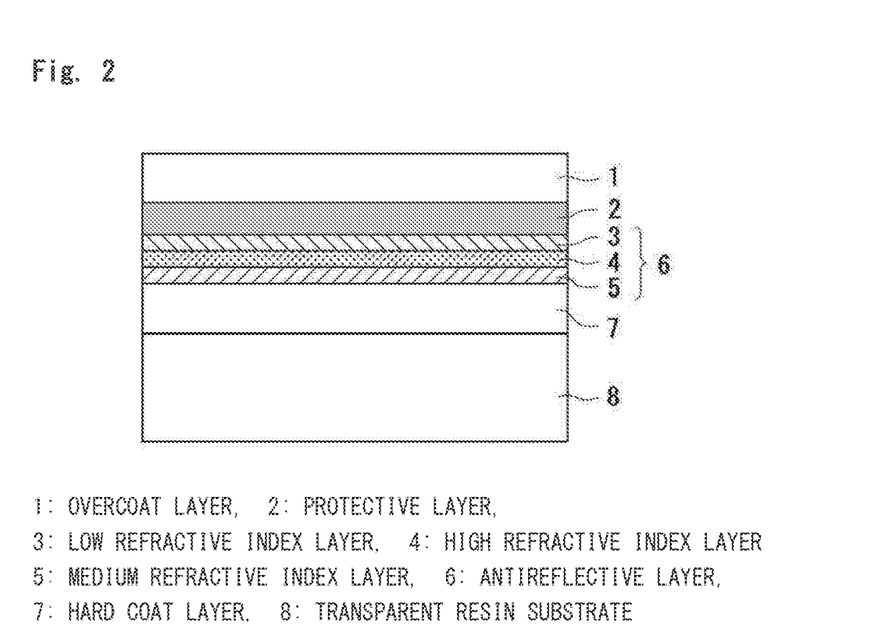
FIG. 2 is a schematic view showing the cross-sectional structure of an antireflection plate according to another embodiment of the present invention.

If the antireflective layer is composed of two layers, i.e., a medium refractive index layer to be described later, and the low refractive index layer, the medium refractive index layer is first formed on the hard coat layer, and then the low refractive index layer is formed on the resulting layer.

Furthermore, if the anti reflective layer is composed of three layers, i.e., the medium refractive index layer, a high refractive index layer to be described later, and the low refractive index layer, the medium refractive index layer is first formed on the hard coat layer, then the high refractive index layer is formed thereon, and the low ref reactive index layer is further formed thereon.

<Medium Refractive Index Layer>

For a further improvement in its antireflective effect, the transparent resin laminated plate of the present invention is preferably configured to have a two-layer structure in which a medium refractive index layer is laminated on the transparent resin substrate side of the low refractive index layer.

The medium refractive index layer is preferably a layer having a refractive index of 1.50 to 1.75 and a thickness of 50 to 200 nm.

The medium refractive index layer is typically formed by curing a curable composition containing 100 to 175 parts by mass of (F) an organic-inorganic composite compound and 150 to 300 parts by mass of (G) metal oxide particles with respect to a total of 100 parts by mass of 90 to 95 parts by mass of the silane coupling compound or hydrolysate thereof (C) and 10 to 5 parts by mass of the metal chelate compound (D).

<(F) Organic-Inorganic Composite Compound>

In the medium refractive index layer, an organic-inorganic composite compound is used to enhance adhesion between the hard coat layer and the low refractive index layer, which is laminated on the medium refractive index layer, and improve alkali resistance.

The organic-inorganic composite compound is, for example, a composite compound having an alkoxysilyl group bound to a bisphenol A epoxy compound. In this compound, crosslinking of the epoxy groups between the compounds has occurred, and formation of silica particles by sol-gel curing of the alkoxysilyl groups has occurred. The resulting compound is a cured product having the advantages of both an organic material and an inorganic material, but not having a glass transition temperature (Tg) as in glass.

The organic-inorganic composite compound is present as a compound of a varying type. An example is a composite compound having a structure in which an alkoxysilyl group is bound to a bisphenol A epoxy compound, a novolak phenol compound, or a polyamic acid compound. A preferred example of the organic-inorganic composite compound is a composite compound having an alkoxysilyl group bound to a bisphenol A epoxy compound, from the viewpoint of being easily available while minimally impairing the hardness of the medium refractive index layer.

<(G) Metal Oxide Particles>

The metal oxide particles are incorporated for the purpose of fulfilling the requirement that the refractive index of the medium refractive index layer be 1.50 to 1.75. Typically, they are metal oxide particles having an average particle diameter of 10 to 100 nm and a refractive index of 1.70 or higher, but 2.80 or lower.

As the metal oxide particles, use is made of zirconium oxide particles (refractive index=2.40); composite zirconium metal oxide particles comprising zirconium oxide rendered composite on the molecular level in combination with another oxide, such as silicon oxide, for adjustment of refractive index; titanium oxide particles (refractive index=2.71); composite titanium metal oxide particles comprising titanium oxide rendered composite on the molecular level in combination with another oxide, such as silicon oxide or zirconium oxide, for adjustment of refractive index; and silica particles (refractive index=1.55). A selection is made from these metal oxide particles, or these particles are used in a suitable combination to adjust the resulting layer to a desired refractive index. Such particles are publicly known per se, and commercially available.

<Formation of Medium Refractive Index Layer>

The medium refractive index layer is formed on the hard coat layer laminated on the transparent resin substrate. The formation of the medium refractive index layer is performed in the same manner as is the formation of the low refractive index layer. The thickness of the resulting layer is set at 50 to 200 nm from the viewpoint of antireflective performance.

<High Refractive Index Layer>

In order to exhibit a markedly high antireflective effect, the antireflection plate of the present invention is preferably configured to have a three-layer structure in which a high refractive index layer is laminated between the low refractive index layer having a refractive index of 1.20 to 1.45 and the medium refractive index layer having a refractive index of 1.50 to 1.75.

The high refractive index layer is preferably a layer having a refractive index of 1.60 to 2.00 and a thickness of 50 to 200 nm. It is essential that the refractive index of the high refractive index layer be higher than the refractive index of the medium refractive index layer.

The high refractive index layer is typically formed by curing a curable composition containing 100 to 600 parts by mass of (g) metal oxide particles with respect to a total of 100 parts by mass of 75 to 95 parts by mass of the silane coupling compound or hydrolysate thereof (C) and 25 to 5 parts by mass of the metal chelate compound (D). The metal oxide particles (g) are selected from the aforementioned metal oxide particles, or a combination of the latter particles is used as the particles (g), so that the refractive index of the high refractive index layer reaches 1.60 to 3.00.

<Formation of High Refractive Index Layer>

The high refractive index layer is formed on the medium refractive index layer laminated on the hard coat layer, and the low refractive index layer is formed on the high refractive index layer to construct a three-layer structure. The formation of the high refractive index layer is performed in the same manner as are the formation of the low refractive index layer and the formation of the medium refractive index layer.

[Protective Layer]

In the present invention, the protective layer is a layer indispensable for exhibiting abrasion resistance. The shape, particle diameter, and content of silica fine particles to be used, and the layer thickness of this layer are important requirements.

That is, it is necessary to incorporate 7.5 to 35 parts by mass of (B-3) spherical silica fine particles having an average particle diameter of 10 nm or less with respect to a total of 100 parts by mass of 90 to 98 parts by mass of the silane coupling compound or hydrolysate thereof (C) and 10 to 2 parts by mass of the metal chelate compound (D). The refractive index of a cured body after curing, as the protective layer, is to be 1.45 to 1.50.

The compounding ratio between the silane coupling compound or hydrolysate thereof (C) and the metal chelate compound (D) is set at 90:10 to 98:2 parts by mass (total 100 parts by mass). This is necessary to enhance the abrasion resistance of the anti reflection plate.

It is essential for the spherical silica fine particles (B-3) to be spherical in shape and to have an average particle diameter of 10 nm or less. If both of these conditions fail to be met, even the provision of the protective layer would not exhibit a high degree or abrasion resistance, because the overcoat layer would not be applied smoothly. The lower limit value of the average particle diameter is not particularly limited, but is preferably 5 nm or more because of easy availability.

The compounded amount of the spherical silica fine particles needs to be 7.5 to 35 parts by mass with respect to a total of 100 parts by mass of the silane coupling compound or hydrolysate thereof (C) and the metal chelate compound (D). If the above amount is less than 7.5 parts by mass, the refractive index of the protective layer increases, and the effect of resisting wear is not exhibited. Besides, layer forming properties decline, resulting in a failure to form a uniform protective layer on the antireflective layer. If the compounded amount, exceeds 35 parts by mass, the protective layer becomes brittle and a defective appearance arises.

The refractive index of the cured body after curing as the protective layer needs to be 1.45 to 1.50. If this requirement is not fulfilled, antireflective ability deteriorates.

The thickness of the layer needs to be 10 to 15 nm. With a thickness of less than 10 nm, the layer does not function as a protective layer. If the thickness exceeds 15 nm, reflectance increases, and antireflective ability lowers.

As the silane coupling compound or hydrolysate thereof (C) and the metal chelate compound (D), those described in the paragraph on the hard coat layer can be used without restriction.

The spherical silica fine particles (B-3) are nonhollow spherical particles comprising single particles, are dense inside, and have no cavities interiorly. Their density is normally 1.9 g/cm$^3$ or more. These spherical, silica fine particle are themselves publicly known and commercially available. Thus, their marketed products satisfying the aforementioned average particle diameter and refractive index may be selected and used. Normally, the silica fine particles are supplied as a dispersion in a solvent. This solvent necessarily mixes into a solution of the curable composition for formation of the protective layer, and behaves like other solvents.

The preparation of the curable composition for formation of the protective layer, and the method of forming the protective layer may be performed like those for the antireflective layer.

[Overcoat Layer]

The overcoat layer is a layer provided to enable the antireflection plate of the present invention to exhibit its inherent abrasion resistance and show a high degree of antifouling properties. This layer comprises a polymer of a fluorine-containing silicon compound.

The polymer of a fluorine-containing silicon compound, concretely, refers to a polymer consisting essentially of a compound, whose main chain is a perfluoropolyether structure and in which an alkoxysilyl group as a hydrolyzable group is present at one end or at each end of the main chain, the polymer being formed by polycondensation of this compound. Owing to the presence of the perfluoropolyether structure, the adhesion of oils and fats lowers to exhibit high antifouling properties.

The fluorine-containing silicon compound is commercially available as a solution in an organic solvent, such as isopropyl ether, hexane, or a fluorine-based organic solvent, under the trade names of "Novec™ Series" produced by 3M Company; "Dow Corning (registered trademark) Series" produced by Dow Corning Toray Co., Ltd.; "SHIN-ETSU SUBELYN™ Series" produced by Shin-Etsu Chemical Co., Ltd.; "OPTOOL" produced by DAIKIN INDUSTRIES, LTD.; and "SURECO (registered trademark) Series" produced by AGC Inc. Preferably, any of these products is procured and used.

A solution containing the above fluorine-containing silicon compound is coated on the protective layer by an ordinary method, and then held for about 6 to 8 hours at a temperature in the vicinity of 100° C., whereby the coating is dried and cured to become a polymer.

The thickness of the overcoat layer is set usually at 5 to 15 nm in order to serve the function of this layer.

The antireflection plate of the present invention is not limited to the foregoing layer configurations. For example, a pressure-sensitive adhesive layer comprising an acrylate-based, rubber-based or silicone-based pressure-sensitive adhesive can be provided on the back of the transparent resin laminated plate. Alternatively, the hard coat layer, the anti reflective layer, the protective layer, and the overcoat layer may be laminated on each of the face and back of the transparent resin substrate.

There are no restrictions on display devices to be mounted with the antireflection plate of the present invention. Examples of its uses are general display devices such as CRT, LCD, and PDP, and touch panels of smartphones, tablets, ATMs, and ticket vending machines. When the inventive antireflection plate is mounted on single-lens reflex cameras, medical panels, and touch panels for use in car navigation systems, in particular, its performance is offered maximally.

EXAMPLES

The present invention will, now be described concretely by reference to Examples, but is in no way limited thereby. Not all of combinations of the characteristic features explained in the Examples are essential to the means for solving the problems that the present invention tackles.

Various components and abbreviations, and testing methods used in the following Examples and Comparative Examples will be described below.

(A) Polymerizable Monomer
  a-1: Bifunctional acrylate
    Ethylene glycol diacrylate
  a-2: Trifunctional urethane acrylate
    Urethane acrylate having three acrylate groups at the end
  a-3: Hexafunctional urethane acrylate
    Urethane acrylate prepolymer having six acrylate groups at the end
(B) Silica Fine Particles
  b-1: Spherical silica fine particles
    Spherical, average particle diameter=7 nm,
    Refractive index=1.46,
    IPA dispersion, solid content: 20 wt. %
  b-2: Hollow silica fine particles
    Hollow particles, average particle diameter=60 nm,
    Refractive index=1.30,
    IPA dispersion, solid content: 20 wt. %
  b-3: Silica fine particles
    Spherical silica fine particles "b-1" were used.
  b-4: Silica fine particles
    Spherical, average particle diameter=20 nm,
    Refractive index=1.47,
    IPA dispersion, solid content: 20 wt. %
(C) Silane Coupling Compound
  c-1: γ-glycidoxypropyltrimethoxysilane (γ-GPS)
(D) Metal Chelate Compound 1
  d-1: Aluminum trisacetylacetonate (ATAA)
(E) Fluorine-containing silicon compound
  e-1: Solution containing an alkoxysilane with perfluoropolyether as a main chain
    Solvent: fluorine-based solvent,
    Active ingredient concentration: 20 wt. %
    Viscosity (25° C.)=1.0 mm$^2$/s
(F) Organic-Inorganic Composite Compound
  f-1: Alkoxy group-containing silane-modified epoxy compound
    Trialkoxymethylsilyl group-modified bisphenol A epoxy compound
(G) Metal Oxide Particles
  g-1: Zirconia particles
    Refractive index=2.42, average particle diameter=60 to 70 nm,
    PGM (1-methoxy-2-propanol) dispersion, solid content: 55 wt. %
  g-2: Zirconia particles
    Refractive index=2.40, average particle diameter=20 to 30 nm,
    Alcohol dispersion, solid content: 20 wt. %
(H) Other Compounded Materials
  h-1: IPA (isopropyl alcohol.)
  h-2: SBAC (acetic acid sec-butyl ester)
  h-3: NPA (n-propyl alcohol)
  h-4: MIBK (methyl isobutyl ketone)
  h-5: Ethanol
  h-6: Polymerization initiator (1-hydroxycyclohexyl phenyl ketone)
  h-7: Ultraviolet absorber (benzotriazole-based)
  h-8: 0.05N acetic acid

[Total Light Reflectance]
Reflectance at the lowest point (surface of the transparent resin substrate) was measured at a scanning speed of 1000 nm/min at a wavelength of 380 to 780 nm using JASCO Corporation's "V-650" tester. The lower its value is, the better antireflective ability is shown.

[Luminous Average Reflectance]
Reflectance at the lowest point (surface of the transparent resin substrate) was measured at a scanning speed of 1000 nm/min at a wavelength of 380 to 780 nm using JASCO Corporation's "V-650" tester. This reflectance was multiplied by the weighting factor described in JIS Z 8722 to calculate a luminous average reflectance. The lower its value is, the better antireflective ability is shown.

[Abrasion Resistance Test]
1. Calico (Plain Woven Cotton Cloth) Abrasion Resistance:
A specimen was set on a rub tester, and reciprocated 3000 times over a distance of 40 mm under a load of 500 g/cm$^2$ using Calico (plain woven cotton cloth) No. 3 produced by Japanese Standards Association. Whether or not scuffs were caused by the reciprocations was determined, and the number of the scuffs, if any, was counted to evaluate abrasion resistance. Evaluation criteria are offered below. In the present test, transmitted light refers to light transmitted through the transparent resin laminated plate, while reflected light refers to light reflected by the surface of this laminated plate.

"◯": No scuffs were seen upon observation of both transmitted light and reflected light.
"Δ": Several scuffs were seen upon observation of transmitted light, but no scuffs were seen in the case of reflected light.
"X": Several scuffs were seen upon observation of each of transmitted light and reflected light.

2. Steel Wool Abrasion Resistance:
A specimen was set on a rub tester, and reciprocated 20 times on Steel Wool #0000 ("BONSTER", a product of Nippon Steel Wool Co., Ltd.) over a distance of 40 mm under a load of 500 g/cm$^2$. Whether or not scuffs were caused by the reciprocations was determined, and the number of the scuffs, if any, was counted to evaluate abrasion resistance. Evaluation criteria are offered below. In the present test, transmitted light refers to light transmitted through the transparent resin laminated plate, while reflected light refers to light reflected by the surface of this laminated plate. This test using the metal involves a testing method to be conducted under very severe conditions in comparison with the above-mentioned calico abrasion resistance test.

"◯": No scuffs were seen upon observation of both transmitted light and reflected light.
"Δ": Several scuffs were seen upon observation of transmitted light, but no scuffs were seen in the case of reflected light.
"X"; Several scuffs were seen upon observation of each of transmitted light and reflected light.

[Antifouling Test]
A line about 2 mm wide was drawn on a specimen with the use of a permanent marker pen "M-10EF-B" produced by PILOT Corporation to check whether the marking ink of the pen was repelled.

"◯": The marking ink was repelled in the form of a ball by the specimen.
"Δ": The marking ink was repelled in the form of a line by the specimen.
"X": The marking ink was compatible with the specimen to leave a line behind.

Example 1

A 1 mm thick laminated resin substrate composed of an aromatic polycarbonate resin (PC) and a polymethyl methacrylate resin (PMMA) (thickness of the PC layer=0.93 mm, thickness of the PMMA layer=0.07 mm; masking film applied on the PC layer side) had, on the PMMA side, a hard coat layer, an antireflective layer, a protective layer, and an overcoat layer formed in this order by the following methods:

[Formulation of Solution for Formation of Hard Coat Layer]
(A) Polymerizable Monomer
  a-1: 8 g
  a-2: 14 g
  a-3: 125 g
(B) Silica Fine Particles
  b-1: 200 g (including dispersion solvent)
(C) Silane Coupling Compound
  c-1: 12 g
(D) Metal Chelate Compound
  d-1: 1 g
(H) Other Materials Compounded
  h-1: 305 g
  h-4: 315 g
  h-7: 11.2 g
  h-8: 2.8 g
[Formulation of Solution for Formation of Low Refractive Index Layer]
(B) Silica Fine Particles
  b-2: 50 g (including dispersion solvent)
(C) Silane Coupling Compound
  c-1: 10 g
(D) Metal Chelate Compound
  d-1: 0.5 g
(H) Other Materials Compounded
  h-2: 465 g
  h-3: 465 g
  h-8: 4.5 g
[Formulation of Solution for Formation of Protective Layer]
(B) Silica Fine Particles
  b-3 (b-1): 3.5 g (including dispersion solvent)
(C) Silane Coupling Compound
  c-1: 7.1 g
(D) Metal Chelate Compound
  d-1: 0.4 g
(H) Other Materials Compounded
  h-2: 493 g
  h-3: 493 g
  h-8: 3.3 g
[Formulation of Solution for Formation of Overcoat Layer]
(E) Polymer of Fluorine-Containing Silicon Compound
  e-1: 750 g (including dispersion solvent; solid content 1.5 g)

First of all, the laminated transparent resin substrate was dip-coated with the composition for formation of a hard coat layer having the above formulation. The coating was dried at 60° C. for 5 minutes for UV curing to form a hard coat layer with a thickness of 1.5 µm. Then, the substrate having the hard coat layer was dip-coated with the composition for formation of an antireflective layer. The coating was heat-treated at 90° C. for 20 minutes to form an antireflective layer (low refractive index layer) 86 nm thick. Then, the composition for formation of a protective layer was applied to the layer by dip coating, and then heat-treated at 90° C. for 20 minutes to form a protective layer. Finally, the composition for formation of an overcoat layer was applied to the layer by dip coating, and then heat-treated at 90° C. for 6 hours to form an overcoat layer. In this manner, an antireflection plate according to the present invention was obtained.

The total light reflectance, luminous average reflectance, calico abrasion resistance, steel wool abrasion resistance, and antifouling properties of the resulting antireflection plate were measured and evaluated in accordance with the above-described testing methods. The results are shown in Table 3.

Examples 2 and 3

Antireflection plates were prepared in the same manner as in Example 1, except that the compositions for formation of a protective layer shown in Table 1 were used. Measurements were conducted in the same manner as in Example 1. The results are shown in Table 4.

Examples 4 and 5

Antireflection plates were prepared in the same manner as in Example 2, except that the compositions for formation of a low refractive index layer shown in Table 1 were used. Measurements were conducted in the same manner as in Example 2. The results are shown in Table 4.

Examples 6 and 7

Antireflection plates were prepared in the same manner as in Example 1, except that the compositions for formation of a medium refractive index layer and a high refractive index layer shown in Table 2 were used to configure an antireflective layer as a three-layer structure. In detail, a hard coat layer was formed on a laminated transparent resin substrate in the same manner as in Example 1. Then, a medium refractive index layer was first formed using the composition for formation of a medium refractive index layer shown in Table 2, whereafter a high refractive index layer was formed using the composition for formation of a high refractive index layer shown in Table 2. The coating method and the conditions for layer formation were the same as those for the low refractive index layer. Then, a low refractive index layer, a protective layer, and an overcoat layer were formed sequentially in accordance with Example 1 to obtain an antireflection plate. The results are shown in Table 4. The solvent used for the composition for formation of the medium refractive index layer was a solvent composed of IPA (h-1) and MIBK (h-4) at a composition ratio of 40:60 (mass ratio). The solvent used for the composition for formation of the high refractive index layer was a solvent composed of 100% by mass of ethanol (h-5).

Comparative Examples 1 to 6

Antireflection plates were prepared in the same manner as in Example 1, except that the composition for formation of a protective layer and the composition for formation of a low refractive index layer shown in Table 3 were used. Measurements were conducted in the same manner as in Example 1. The results are shown in Table 4.

TABLE 1

| | | Example 1 | | Example 2 | | Example 3 | | Example 4 | | Example 5 | |
|---|---|---|---|---|---|---|---|---|---|---|---|
| | | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] |
| Protective layer | Silane coupling compound | | | | | | | | | | |
| | γ-GPS | 7.1 | 97.4 | 6.3 | 93.7 | 5.5 | 92.8 | 6.3 | 93.7 | 6.3 | 93.7 |
| | Metal chelate compound | | | | | | | | | | |
| | ATAA | 0.4 | 5.6 | 0.4 | 6.3 | 0.4 | 7.2 | 0.4 | 6.3 | 0.4 | 6.3 |
| | Subtotal | | 100 | | 100 | | 100 | | 100 | | 100 |
| | Silica fine particles | | | | | | | | | | |
| | spherical silica fine particles b-3 | 0.7 | 9.3 | 1.3 | 19.4 | 2 | 33.9 | 1.3 | 19.4 | 1.3 | 19.4 |
| | dispersion solvent | 2.8 | | 5.2 | | 8 | | 5.2 | | 5.2 | |
| | Hydrolysis catalyst | | | | | | | | | | |
| | h-8 | 3.3 | | 2.9 | | 2.5 | | 2.9 | | 2.9 | |
| | Solvent | 985.7 | | 983.9 | | 981.6 | | 983.9 | | 983.9 | |
| | Total amount | 1000 | | 1000 | | 1000 | | 1000 | | 1000 | |
| | Film thickness | 15 nm | | 15 nm | | 15 nm | | 15 nm | | 15 nm | |
| | Refractive index | 1.499 | | 1.499 | | 1.495 | | 1.499 | | 1.499 | |
| Low refractive index layer | Silane coupling compound | | | | | | | | | | |
| | γ-GPS | 10 | 95.2 | 10 | 95.2 | 10 | 95.2 | 7 | 93.3 | 13 | 96.3 |
| | Metal chelate compound | | | | | | | | | | |
| | ATAA | 0.5 | 4.8 | 0.5 | 4.8 | 0.5 | 4.8 | 0.5 | 6.7 | 0.5 | 3.7 |
| | Subtotal | | 100 | | 100 | | 100 | | 100 | | 100 |
| | Silica fine particles | | | | | | | | | | |
| | hollow silica fine particles b-2 | 10 | 95.2 | 10 | 95.2 | 10 | 95.2 | 13 | 173 | 7 | 51.9 |
| | dispersion solvent | 40 | | 40 | | 40 | | 52 | | 28 | |
| | Hydrolysis catalyst | | | | | | | | | | |
| | h-8 | 4.5 | | 4.5 | | 4.5 | | 4.5 | | 4.5 | |
| | Solvent | 935 | | 935 | | 935 | | 923 | | 947 | |
| | Total amount | 1000 | | 1000 | | 1000 | | 1000 | | 1000 | |
| | Film thickness | 85 nm | | 85 nm | | 85 nm | | 85 nm | | 85 nm | |
| | Refractive index | 1.35 | | 1.35 | | 1.35 | | 1.285 | | 1.39 | |

TABLE 2

| | | Example 6 | | Example 7 | |
|---|---|---|---|---|---|
| | | Compounded amount [g] | Solid content ratio [wt %] | Compounded amount [g] | Solid content ratio [wt %] |
| Protective layer | Silane coupling compound | | | | |
| | γ-GPS | 6.3 | 93.7 | 6.3 | 93.7 |
| | Metal chelate compound | | | | |
| | ATAA | 0.4 | 6.3 | 0.4 | 6.3 |
| | Subtotal | | 100 | | 100 |
| | Silica fine particles | | | | |
| | spherical silica fine particles b-3 | 1.3 | 19.4 | 1.3 | 19.4 |
| | dispersion solvent | 5.2 | | 5.2 | |
| | Hydrolysis catalyst | | | | |
| | h-8 | 2.9 | | 2.9 | |
| | Solvent | 983.9 | | 983.9 | |
| | Total amount | 1000 | | 1000 | |
| | Film thickness | 15 nm | | 15 nm | |
| | Refractive index | 1.499 | | 1.499 | |
| Low refractive index layer | Silane coupling compound | | | | |
| | γ-GPS | 10 | 95.2 | 10 | 95.2 |
| | Metal chelate compound | | | | |
| | ATAA | 0.5 | 4.8 | 0.5 | 4.8 |
| | Subtotal | | 100 | | 100 |
| | Silica fine particles | | | | |
| | hollow silica fine particles b-2 | 10 | 95.2 | 10 | 95.2 |
| | dispersion solvent | 40 | | 40 | |
| | Hydrolysis catalyst | | | | |
| | h-8 | 4.5 | | 4.5 | |
| | Solvent | 935 | | 935 | |
| | Total amount | 1000 | | 1000 | |
| | Film thickness | 85 nm | | 85 nm | |
| | Refractive index | 1.35 | | 1.35 | |
| High refractive index layer | Silane coupling compound | | | | |
| | γ-GPS | 12.2 | 94 | 3 | 78.9 |
| | Metal chelate compound | | | | |
| | ATAA | 0.8 | 6 | 0.8 | 21.1 |
| | Subtotal | | 100 | | 100 |
| | Metal oxide particles | | | | |
| | zirconia particles g-2 | 15 | 115 | 22.5 | 590 |
| | dispersion solvent | 60 | | 90 | |
| | Hydrolysis catalyst | | | | |
| | h-8 | 1.4 | | 1.4 | |
| | Solvent | 910.6 | | 882.3 | |
| | Total amount | 1000 | | 1000 | |
| | Film thickness | 70 nm | | 70 nm | |
| | Refractive index | 1.68 | | 1.77 | |

TABLE 2-continued

|  |  | Example 6 | | Example 7 | |
|---|---|---|---|---|---|
|  |  | Compounded amount [g] | Solid content ratio [wt %] | Compounded amount [g] | Solid content ratio [wt %] |
| Medium refractive index layer | Silane coupling compound | | | | |
|  | γ-GPS | 6.6 | 91.7 | 8.8 | 93.6 |
|  | Metal chelate compound | | | | |
|  | ATAA | 0.6 | 8.3 | 0.6 | 6.4 |
|  | Subtotal | | 100 | | 100 |
|  | Metal oxide particles | | | | |
|  | zirconia particles g-1 | 21.6 | 300 | 14.4 | 150 |
|  | dispersion solvent | 17.7 | | 11.8 | |
|  | Organic-inorganic composite compound | | | | |
|  | silane-modified epoxy compound f-1 | 9 | 125 | 14.4 | 150 |
|  | dispersion solvent | 8.8 | | 14.1 | |
|  | Hydrolysis catalyst | | | | |
|  | h-8 | 4.2 | | 4.2 | |
|  | Solvent | 931.5 | | 931.7 | |
|  | Total amount | 1000 | | 1000 | |
|  | Film thickness | 75 nm | | 75 nm | |
|  | Refractive index | 1.64 | | 1.58 | |

TABLE 3

|  |  | Comp. Ex. 1 | | Comp. Ex. 2 | | Comp. Ex. 3 | | Comp. Ex. 4 | | Comp. Ex. 5 | | Comp. Ex. 6 | |
|---|---|---|---|---|---|---|---|---|---|---|---|---|---|
|  |  | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] |
| Protective layer | Silane coupling compound | | | | | | | | | | | | |
|  | γ-GPS | 7.5 | 94.9 | 4.7 | 92.1 | 6.3 | 93.7 | 6.3 | 93.7 | 6.3 | 93.7 | 6.3 | 93.7 |
|  | Metal chelate compound | | | | | | | | | | | | |
|  | ATAA | 0.4 | 5.1 | 0.4 | 7.9 | 0.4 | 6.3 | 0.4 | 6.3 | 0.4 | 6.3 | 0.4 | 6.3 |
|  | Subtotal | | 100 | | 100 | | 100 | | 100 | | 100 | | 100 |
|  | Silica fine particles | | | | | | | | | | | | |
|  | spherical silica fine particles b-3 | 0.3 | 3.8 | 2.6 | 51 | 1.3 | 19.4 | 1.3 | 19.4 | 1.3 | 19.4 | | |
|  | spherical silica fine particles b-4 | | | | | | | | | | | 1.3 | 19.4 |
|  | dispersion solvent | 1.2 | 10.4 | | 5.2 | | 5.2 | | 5.2 | | 5.2 | | 5.2 |

TABLE 3-continued

|  |  | Comp. Ex. 1 | | Comp. Ex. 2 | | Comp. Ex. 3 | | Comp. Ex. 4 | | Comp. Ex. 5 | | Comp. Ex. 6 | |
|---|---|---|---|---|---|---|---|---|---|---|---|---|---|
|  |  | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] | Compounded amount [g] | Solid content ratio [wt %] |
|  | Hydrolysis catalyst | | | | | | | | | | | | |
|  | h-8 | 3.4 | | 2.2 | | 2.9 | | 2.9 | | 2.9 | | 2.9 | |
|  | Solvent | 987.2 | | 979.7 | | 983.9 | | 983.9 | | 983.9 | | 983.9 | |
|  | Total amount | 1000 | | 1000 | | 1000 | | 1000 | | 1000 | | 1000 | |
|  | Film thickness | 15 nm | | 15 nm | | 7 nm | | 15 nm | | 15 nm | | 15 nm | |
|  | Refractive index | 1.499 | | 1.49 | | 1.499 | | 1.499 | | 1.499 | | 1.499 | |
| Low refractive index layer | Silane coupling compound | | | | | | | | | | | | |
|  | γ-GPS | 10 | 95.2 | 10 | 95.2 | 10 | 95.2 | 5.5 | 91.2 | 14 | 96.6 | 10 | 95.2 |
|  | Metal chelate compound | | | | | | | | | | | | |
|  | ATAA | 0.5 | 4.8 | 0.5 | 4.8 | 0.5 | 4.8 | 0.5 | 9.8 | 0.5 | 3.4 | 0.5 | 4.8 |
|  | Subtotal | | 100 | | 100 | | 100 | | | | | | 100 |
|  | Silica fine particles | | | | | | | | | | | | |
|  | hollow silica fine particles b-2 | 10 | 95.2 | 10 | 95.2 | 10 | 95.2 | 14 | 230 | 6 | 41.4 | 10 | 95.2 |
|  | dispersion solvent | 40 | | 40 | | 40 | | 56 | | 24 | | 35 | |
|  | Hydrolysis catalyst | | | | | | | | | | | | |
|  | h-8 | 4.5 | | 4.5 | | 4.5 | | 4.5 | | 4.5 | | 4.5 | |
|  | Solvent | 935 | | 935 | | 935 | | 919.5 | | 951 | | 940 | |
|  | Total amount | 1000 | | 1000 | | 1000 | | 1000 | | 1000 | | 1000 | |
|  | Film thickness | 85 nm | | 85 nm | | 85 nm | | 85 nm | | 85 nm | | 85 nm | |
|  | Refractive index | 1.35 | | 1.35 | | 1.35 | | 1.256 | | 1.385 | | 1.35 | |

TABLE 4

|  | Total light reflectance | Luminous average reflectance | Calico 500 g 3000 times | Steel wool 500 g 20 times | Antifouling properties test |
|---|---|---|---|---|---|
| Ex. 1 | 2.30% | 2.58% | ○ | Δ | ○ |
| Ex. 2 | 2.20% | 2.47% | ○ | Δ | ○ |
| Ex. 3 | 2.20% | 2.45% | ○ | Δ | ○ |
| Ex. 4 | 1.55% | 1.85% | Δ | Δ | ○ |
| Ex. 5 | 3.20% | 3.95% | ○ | ○ | ○ |
| Ex. 6 | 2.30% | 2.50% | ○ | ○ | ○ |
| Ex. 7 | 0.73% | 0.77% | Δ | Δ | ○ |
| Comp. Ex. 1 | 2.35% | 2.65% | ○ | X | ○ |
| Comp. Ex. 2 | 2.30% | 2.56% | ○ | X | Δ |
| Comp. Ex. 3 | 1.90% | 2.19% | X | Δ | Δ |
| Comp. Ex. 4 | 1.49% | 1.70% | X | Δ | Δ |
| Comp. Ex. 5 | 3.60% | 3.70% | Δ | X | Δ |
| Comp. Ex. 6 | 2.47% | 2.67% | X | X | X |

A comparison of Example 1 with Comparative Example 1 or 2 shows that no matter whether the amount of the spherical silica fine particles in the protective layer is insufficient or excessive, a high degree of abrasion resistance is not exhibited. Comparative Example 3 shows that if the layer thickness of the protective layer is less than 10 nm, calico abrasion resistance in a mild test of abrasion is low, demonstrating very poor abrasion resistance. In Comparative Example 4, if the compounded amount of the hollow silica fine particles in the low refractive index layer is excessive, calico abrasion resistance in a mild test of abrasion is low, showing very poor abrasion resistance. In Comparative Example 5, if the compounded amount of the hollow silica fine particles in the low refractive index layer is insufficient, neither antireflective capability nor abrasion resistance is exhibited. In Comparative Example 6, if the average particle diameter of the spherical silica fine particles in the protective layer exceeds 10 nm, the coating film performance of the overcoat layer deteriorates, thus failing to exhibit abrasion resistance and antifouling properties.

The invention claimed is:

1. An antireflection plate in which a hard coat layer, an antireflective layer having a low refractive index layer, a protective layer, and an overcoat layer are laminated in this order on a transparent resin substrate, wherein
the low refractive index layer is a cured body of a curable composition containing 50 to 200 parts by mass of (B-2) hollow silica fine particles having an average particle diameter of 10 to 150 nm with respect to a total of 100 parts by mass of 90 to 98 parts by mass of (C) a silane coupling compound or a hydrolysate thereof and 10 to 2 parts by mass of (D) a metal chelate compound, the low refractive index layer having a refractive index of 1.20 to 1.45,
the protective layer is a cured body of a curable composition containing 7.5 to 35 parts by mass of (B-3) spherical silica fine particles having an average particle diameter of 10 nm or less with respect to a total of 100 parts by mass of 90 to 98 parts by mass of (C) a silane coupling compound or a hydrolysate thereof and 10 to 2 parts by mass of (D) a metal chelate compound, the protective layer having a thickness of 10 to 15 nm and a refractive index of 1.45 to 1.50, and
the overcoat layer comprises (E) a polymer of a fluorine-containing silicon compound.

2. The antireflection plate according to claim 1, wherein the antireflective layer is composed of two layers that include the low refractive index layer, and a medium refractive index layer provided on a transparent resin substrate side of the low refractive index layer and having a refractive index of 1.50 to 1.75.

3. The antireflection plate according to claim 2, wherein the medium refractive index layer is a cured body of a curable composition containing 100 to 175 parts by mass of (F) an organic-inorganic composite compound and 150 to 300 parts by mass of (G) metal oxide particles with respect to a total of 100 parts by mass of 90 to 95 parts by mass of (C) a silane coupling compound or a hydrolysate thereof and 10 to 5 parts by mass of (D) a metal chelate compound.

4. The antireflection plate according to claim 3, wherein the organic-inorganic composite compound (F) is a composite compound of a structure having an alkoxysilyl group bound to a bisphenol A epoxy compound, a novolak phenol compound, or a polyamic acid compound.

5. The antireflection plate according to claim 1, wherein the antireflective layer is composed of three layers that include the low refractive index layer, a medium refractive index layer having a refractive index of 1.50 to 1.75, and a high refractive index layer provided between the low refractive index layer and the medium refractive index layer and having a refractive index of 1.60 to 2.00, the refractive index of the high refractive index layer being greater than the refractive index of the medium refractive index layer.

6. The antireflection plate according to claim 5, wherein the high refractive index layer is a cured body of a curable composition containing 100 to 600 parts by mass of (G) metal oxide particles with respect to a total of 100 parts by mass of 75 to 95 parts by mass of (C) a silane coupling compound or a hydrolysate thereof and 25 to 5 parts by mass of (D) a metal chelate compound.

7. The antireflection plate according to claim 1, wherein the hard coat layer comprises a resinous cured body of a curable composition containing (A) a polymerizable monomer, (B-1) silica fine particles, (C) a silane coupling compound or a hydrolysate thereof, and (D) a metal chelate compound, and
the polymerizable monomer (A) is contained in an amount of 1500 to 2000 parts by mass, and the silica fine particles (B-1) are contained in an amount of 300 to 500 parts by mass, with respect to a total of 100 parts by mass of 95 to 99 parts by mass of the silane coupling compound or hydrolysate thereof (C) and 1 to 5 parts by mass of the metal chelate compound (D).

8. The antireflection plate according to claim 7, wherein in the curable composition for formation of the hard coat layer, the polymerizable monomer (A) comprises a hexafunctional or higher functional urethane acrylate monomer, a trifunctional or tetrafunctional urethane acrylate monomer, and a bifunctional acrylate monomer, the trifunctional or tetrafunctional urethane acrylate monomer being contained in an amount of 5.0 to 15.0 parts by mass, and the bifunctional acrylate monomer being contained in an amount of 5.0 to 10.0 parts by mass, with respect to 100 parts by mass of the hexafunctional or higher functional urethane acrylate monomer.

9. An antireflective display device characterized in that the antireflection plate according to claim 1 is laminated on a surface of a display device via the transparent resin substrate of the antireflection plate.

* * * * *